United States Patent
An et al.

(10) Patent No.: US 10,671,636 B2
(45) Date of Patent: Jun. 2, 2020

(54) IN-MEMORY DB CONNECTION SUPPORT TYPE SCHEDULING METHOD AND SYSTEM FOR REAL-TIME BIG DATA ANALYSIS IN DISTRIBUTED COMPUTING ENVIRONMENT

(71) Applicant: Korea Electronics Technology Institute, Seongnam-si, Gyeonggi-do (KR)

(72) Inventors: Jae Hoon An, Incheon (KR); Jae Gi Son, Yongin-si (KR); Chang Won Park, Hwaseong-si (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 432 days.

(21) Appl. No.: 15/464,798

(22) Filed: Mar. 21, 2017

(65) Prior Publication Data
US 2017/0337253 A1 Nov. 23, 2017

(30) Foreign Application Priority Data

May 18, 2016 (KR) .................. 10-2016-0060908
Feb. 23, 2017 (KR) .................. 10-2017-0023893

(51) Int. Cl.
*G06F 15/16* (2006.01)
*G06F 16/27* (2019.01)

(52) U.S. Cl.
CPC .................. *G06F 16/27* (2019.01)

(58) Field of Classification Search
CPC .................................................. G06F 16/27

(Continued)

(56) References Cited

U.S. PATENT DOCUMENTS

| 8,978,034 B1* | 3/2015 | Goodson | G06F 9/5038 |
| | | | 718/101 |
| 2005/0204076 A1* | 9/2005 | Cumpson | H04N 21/23 |
| | | | 710/36 |

(Continued)

FOREIGN PATENT DOCUMENTS

| KR | 1020140021345 A | 2/2014 |
| KR | 1020150084098 A | 7/2015 |
| KR | 1020150112357 A | 10/2015 |

OTHER PUBLICATIONS

Khodadi, "A Data-Centric Framework for Development and Deployment of Internet of Things Applications in Clouds". Apr. 7, 2015. IEEE. pp. 1-6. (Year: 2015).*

(Continued)

*Primary Examiner* — Imad Hussain
(74) *Attorney, Agent, or Firm* — Hauptman Ham, LLP

(57) ABSTRACT

Provided herein is an In-Memory DB connection support type scheduling method and system for real-time big data analysis in distributed computing environment. The data processing method according to an embodiment of the present disclosure analyzes data based on a distributed computing environment using a distributed system and dynamically alters a structure of a distributed DB constituting the distributed system based on the distributed computing environment. By this method, it is possible to secure concurrency adaptively to the distributed computing environment by dynamically managing the number of shards, and secure real-timeliness through TMO-based scheduling, thereby ultimately improving the speed/efficiency of big data analysis.

2 Claims, 9 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 2006/0195460 | A1* | 8/2006 | Nori ...................... | G06F 16/252 |
| 2012/0317155 | A1* | 12/2012 | Ogasawara ........... | G06F 16/282 |
| | | | | 707/812 |
| 2014/0114902 | A1* | 4/2014 | McClung ............... | G06N 5/025 |
| | | | | 706/50 |
| 2014/0164162 | A1* | 6/2014 | Rabenold ............... | G06Q 30/08 |
| | | | | 705/26.3 |
| 2016/0078657 | A1* | 3/2016 | McCord ................ | G06T 19/006 |
| | | | | 345/440 |

OTHER PUBLICATIONS

Korean Office Action dated Jan. 17, 2018 in connection with the counterpart Korean Patent Application No. 10-2017-0023893, citing the above reference(s).

Shin, Chang-Sun et al., "TMO-Based Object Group Framework for Supporting Distributed Object Management and Real-Time Services", APPT 003, Sep. 17-19, 2003, LNCS 2834, pp. 525-535, Springer-Verlag Berlin Heidelberg.

Korean Office Action dated Apr. 20, 2017 in connection with the counterpart Korean Patent Application No. 10-2016-0060908, citing the above reference(s).

* cited by examiner

IN-MEMORY DB CONNECTION SUPPORT TYPE SCHEDULING METHOD AND SYSTEM FOR REAL-TIME BIG DATA ANALYSIS IN DISTRIBUTED COMPUTING ENVIRONMENT

CROSS-REFERENCE TO RELATED APPLICATIONS

This application claims priority from Korean Patent Application No. 10-2016-0060908, filed on May 18, 2016 and Korean Patent Application No. 10-2017-0023893, filed on Feb. 23, 2017, in the Korean Intellectual Property Office, the disclosure of which is incorporated herein by reference in its entirety.

BACKGROUND

Field

The present disclosure relates to distributed computing technology, and more particularly, to a DBMS structure and scheduling method for real-time analysis of big data based on a distributed computing environment.

Further, the present disclosure relates to real-time stream processing technology, and more particularly, to a real-time stream processing method and apparatus for processing stream data in real-time.

Description of Related Art

In querying and analyzing big data stored in a DBMS, there occurs a problem of not only significant performance degradation and inefficient management of a distributed system, but also limitations that enables only fragmentary analysis by a determined structure.

Especially, when the data becomes enormous, the incidence rate of response delay increases, and the structure of environment settings for application to the distributed computing environment becomes complicated.

Stream data real-time processing engines such as Storm and Spark that are nowadays being provided in the form of open sources have a problem that they cannot support various forms of data at the same time.

Moreover, in the case of adding a new node to analyze big data based on a distributed computing environment using these open sources, the Java Virtual Machine (JVM) environment setting must be renewed, which is cumbersome.

Meanwhile, a real-time processing system must be guaranteed a level of service where delay time is no more than units of seconds, and must provide a certain response speed and predictable performance.

Event stream processing method guarantees short delay time, processes almost all logics, and easily realizes state management. However, the event stream processing method is problematic in that a bottleneck phenomenon may occur when the entire data is concentrated on a certain key, and that error treatment costs may increase since all the events must be processed individually.

Micro-batching method bundles up data in array units and processes the same accordingly, and thus has reduced error treatment costs and high processing rates. However, the micro-batching method is problematic in that it has limitations in processing logics, and that delay time may increase.

Currently, there are real-time processing frameworks such as Storm, Samza and Flink, that use the event stream processing method, and real-time processing frameworks such as Spark and the like, that use the micro-batching method, but there is no structure that supports the event stream processing method and the micro-batching method at the same time. Further, processing streams in the micro-batching method using a conventional framework causes a phenomenon of significantly increased delay time due to data being concentrated on a certain time zone.

Due to this phenomenon, there occurs a problem where the array interval must be re-set in certain time zones where data is concentrated, so as to maintain a short delay time, and a problem where a real-time stream data processing framework must be altered or integrated with another platform according to service characteristics or structural classification (structured, semi-structured, unstructured) of the stream data, so as to solve the performance issue.

SUMMARY

The present disclosure is directed to solving the aforementioned problems, and therefore to provide a big data processing method for dynamically managing the number of shards as a measure to secure concurrency, and to provide a BBMS where such a method is applied.

Further, another purpose of the present disclosure is to provide a big data processing method for performing scheduling based on a Time-triggered Message-triggered Object (TMO) as a measure to secure real-timeliness, and to provide a BBMS where such a method is applied.

Further, yet another purpose of the present disclosure is to provide a real-time stream processing method that selects a real-time stream data processing method according to the type of the stream data and processes the input stream data according to the selected real-time stream data processing method, and an apparatus and record medium where such a method is applied.

Further, yet another purpose of the present disclosure is to provide a real-time stream processing method that selects a real-time stream data processing method from the micro-batching method and the event stream processing method according to the type of the stream data and processes the stream data accordingly, and an apparatus and record medium where such a method is applied, wherein the micro-batching method is characterized to use a buffer having a fixed size.

According to an embodiment of the present disclosure for achieving the aforementioned purposes, there is provided a data processing method including: analyzing data based on a distributed computing environment using a distributed system; and dynamically altering a structure of a distributed DB constituting the distributed system based on the distributed computing environment.

Further, the altering may remove at least one of shards constituting the distributed DB or add a new shard.

Further, the altering may alter the structure of the distributed DB when the number of distributed servers constituting the distributed system is altered.

Further, the distributed DB may be linked with an In-Memory DB.

Further, the data processing method may further include performing scheduling for data analysis of distributed servers constituting the distributed system.

Further, the performing scheduling may be differentiated into time actuation deadline scheduling and event based deadline scheduling.

Further, the data may be combined data of at least one of structured data, semi-structured data and unstructured data.

Further, the performing scheduling may perform the scheduling based on a Time-triggered Message-triggered Object (TMO).

Further, the performing scheduling may select a distributed server capable of processing the scheduling within a deadline.

Meanwhile, according to another embodiment of the present disclosure, there is provided a DBMS including: a distributed DB; and a distributed server configured to analyze data based on a distributed computing environment and dynamically alter a structure of the distributed DB based on the distributed computing environment.

Meanwhile, according to another embodiment of the present disclosure, there is provided a data processing method including: performing scheduling for data analysis of distributed servers constituting a distributed system based on a Time-triggered Message-triggered Object (TMO); and analyzing data based on a distributed computing environment according to a result of the scheduling.

Meanwhile, according to another embodiment of the present disclosure, there is provided a DBMS including: a distributed DB; and a distributed server configured to perform scheduling for analysis of data stored in the distributed DB based on a TMO, and to analyze the data based on a distributed computing environment according to a result of scheduling.

Meanwhile, according to another embodiment of the present disclosure, there is provided a real-time stream processing method including: receiving input of stream data; selecting a real-time stream data processing method according to a type of the stream data; and processing the input stream data according to the selected real-time stream data processing method.

Further, the selecting may select one of a first real-time stream data processing method and a second real-time stream data processing method according to the type of the stream data.

Further, the type of the stream data may include structured data, semi-structured data and unstructured data.

Further, the selecting may select the first real-time stream data processing method as the real-time stream data processing method when the stream data is the unstructured data or the semi-structured data.

Further, the first real-time stream data processing method may be a micro-batching method.

Further, the micro-batching method may use a fixed size buffer.

Further, the selecting may select the second real-time stream data processing method as the real-time stream data processing method when the stream data is the structured data.

Further, the second real-time stream data processing method may be an event stream processing method.

Further, the real-time stream processing method may further include setting an automatic mode or a manual mode, wherein the selecting may select the real-time stream data processing method set by a user.

Meanwhile, according to another embodiment of the present disclosure, there is provided a real-time stream processing apparatus including: an inputter configured to receive input of stream data; a selector configured to select a real-time stream data processing method according to a type of the stream data; and a processor configured to process the input stream data according to the selected real-time stream data processing method.

Meanwhile, according to another embodiment of the present disclosure, there is provided a computer readable record medium having a computer program configured to perform a real-time stream processing method, the method including receiving input of stream data; selecting a real-time stream data processing method according to a type of the stream data; and processing the input stream data according to the selected real-time stream data processing method.

Meanwhile, according to another embodiment of the present disclosure, there is provided a real-time stream processing method including: receiving input of stream data; selecting a real-time stream data processing method from a micro-batching method and an event stream processing method according to a type of the stream data; and processing the input stream data according to the selected real-time stream data processing method, wherein the micro-batching method uses a fixed size buffer.

As described above, according to the embodiments of the present disclosure, it is possible to secure concurrency adaptively to the distributed computing environment by dynamically managing the number of shards, and secure real-timeliness through TMO-based scheduling, thereby ultimately improving the speed/efficiency of big data analysis.

Further, according to the various embodiments of the present disclosure, it is possible to provide a real-time stream processing method that selects a real-time stream data processing method according to the type of the stream data and processes the input stream data according to the selected real-time stream data processing method, and an apparatus and record medium where such a method is applied, and therefore, automatically select a streaming model according to the type of the stream data being introduced, thereby increasing the processing rate of real-time processing service.

Further, as two kinds of streaming models (event stream/micro-batching) are supported at the same time, a conventional configured real-time processing system can be used without being altered. Further, if a bottleneck phenomenon occurs during a stream data processing based on the event stream method, it is possible to automatically select an alternative streaming model, that is, the micro-batching method. Further, the problem of load balancing performance that used to occur when using the micro-batching method can be improved, thereby guaranteeing a shorter delay time.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present between two elements. Like reference numerals refer to like elements throughout.

DETAILED DESCRIPTION

Figure 1:
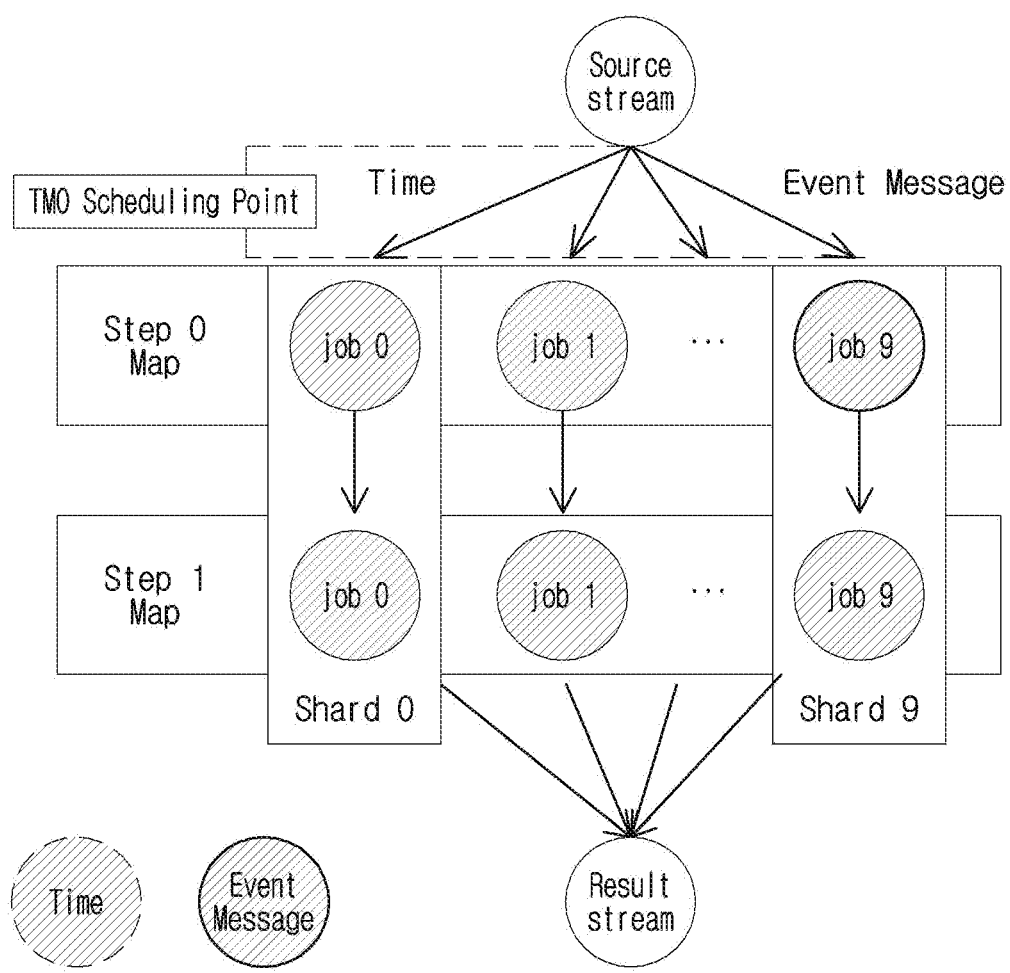
FIG. 1 is a view schematically illustrating a big data processing method according to an embodiment of the present disclosure.

Hereinafter, an embodiment of the present disclosure will be explained in detail with reference to the exemplary drawings attached. In adding a reference numeral to each element in the drawings, it should be noted that like elements use like reference numerals if possible even if the elements are illustrated in other drawings. Further, in explaining an embodiment of the present disclosure, any specific explanation on a well-known configuration or function regarded as possibly obscuring the main point of the present disclosure will be omitted.

Hereinafter, the present disclosure will be explained in further detail with reference to the drawings attached.

1. Big Data Processing Method

FIG. 1 is a view schematically illustrating a big data processing method according to an embodiment of the present disclosure.

As illustrated in FIG. 1, the big data processing method according to the present embodiment of the present disclosure consists of a process of mapping source stream data on distributed systems through scheduling, and filtering, being performed by the distributed systems, for data analysis.

The big data processing method according to the present embodiment of the present disclosure is applied to a distributed system environment of a structure that uses a plurality of shards in order to secure concurrency, as illustrated in FIG. 1.

The number of the shards constituting the distributed system is dynamic. That is, the number of the shards may be increased or decreased freely when necessary in the distributed system environment.

Further, the big data processing method according to the present embodiment of the present disclosure uses scheduling based on a Time-triggered Message-triggered Object (TMO), for real-time processing, as illustrated in FIG. 1.

By this method, even when the stream big data is a combined high speed data, it is possible to improve the processing rate, maximize the quality of processing and analyzing speed, and optimize analysis results.

2. Dynamic Sharding Structure

The distributed system for big data processing according to an embodiment of the present disclosure realizes a distributed DB with a plurality of shards in order to secure concurrency. In FIG. 1, there are ten (10) shards, but this is merely an example. There may of course be a different number of shards instead.

Moreover, the number of the shards may be realized dynamically, and altered if necessary. That is, the number of the shards may be determined dynamically based on the number of distributed servers constituting the distributed system. And thereafter, when the number of the distributed servers is altered, the number of the shards may be increased or decreased accordingly. For example, it is possible to add shards when distributed servers (nodes) are added, and reduce shards when distributed servers are removed.

Further, it is possible to alter the number of the shards based on the main type of the big data being input. For example, when the main type of the big data is altered from structured data to unstructured data, the number of the shards may be increased.

Further, it is also possible to dynamically alter the number of the shards based on the speed of big data analysis in the distributed system. For example, it is possible to increase the number of the shards if the analyzing speed slowed down, and decrease the number of the shards if the analyzing speed accelerated.

Using this dynamic sharding structure, it is possible to maximize the distributed processing performance and support optimized concurrency in collecting the processing results adaptively in response to changes in the distributed computing environment.

3. TMO-Based Scheduling

The distributed system for big data processing according to an embodiment of the present disclosure performs scheduling based on a Time-triggered Message-triggered Object (TMO), in order to secure real-timeliness.

Source stream data stored in a distributed system may include structured stream data (data that can be used in statistical analysis: demographics by region), semi-structured stream data (data that is not refined enough to be used in statistical analysis right away: news articles), and unstructured stream data (data raw data form: video, photo, SNS text) and the like.

The distributed system for big data processing according to the present embodiment of the present disclosure adopted TMO-based scheduling so that such various types of source stream data can be processed in combinations in real time.

Due to the TMO-based scheduling, in the case of processing scheduling for big data analysis in a distributed system environment, it is possible to divide the scheduling into two groups periodically, that is, into time actuation deadline scheduling and event-based deadline scheduling, and process the scheduling accordingly.

By this method, a distributed server for processing scheduling within a deadline is selected, and all the distributed servers are enabled to complete analysis within a deadline without any overlapping.

4. Distributed System

Figure 2:
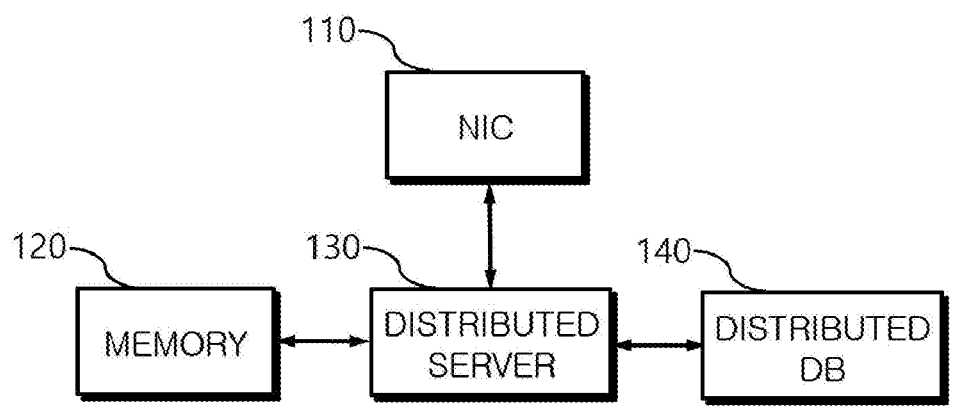
FIG. 2 is a view illustrating a DBMS according to another embodiment of the present disclosure.

FIG. 2 illustrates a Data Base Management System (DBMS) according to another embodiment of the present disclosure. The DBMS according to the present embodiment of the present disclosure includes a Network Interface Card (NIC) 110, a memory 120, a distributed server 130 and a distributed DB 140, as illustrated in FIG. 2.

The NIC 110 is a means for accessing an external system, that is, an external network to perform data communication.

The memory 120 is a volatile storage medium where an In-Memory DB is constructed/operated, and the distributed DB 140 is a mass disk storage where DB data is permanently stored and restored files and replicated files are stored. The distributed DB 140 consists of a plurality of shards.

That is, the DBMS according to the present embodiment of the present disclosure is a DBMS having a structure where the In-Memory DB and the distributed DB are linked to each other.

The distributed server 130 constructs/operates the In-Memory DB in the memory 110, and permanently stores the In-Memory DB in the distributed DB 140. The distributed server 130 physically/logically consists of a plurality of servers.

Further, the distributed server 130 performs analysis on data stored in the distributed DB 140, and performs scheduling for the analysis based on TMO. In addition, the distributed server 130 dynamically configures/alters the number of the shards constituting the distributed DB 140 according to the distributed computing environment.

Figure 3:
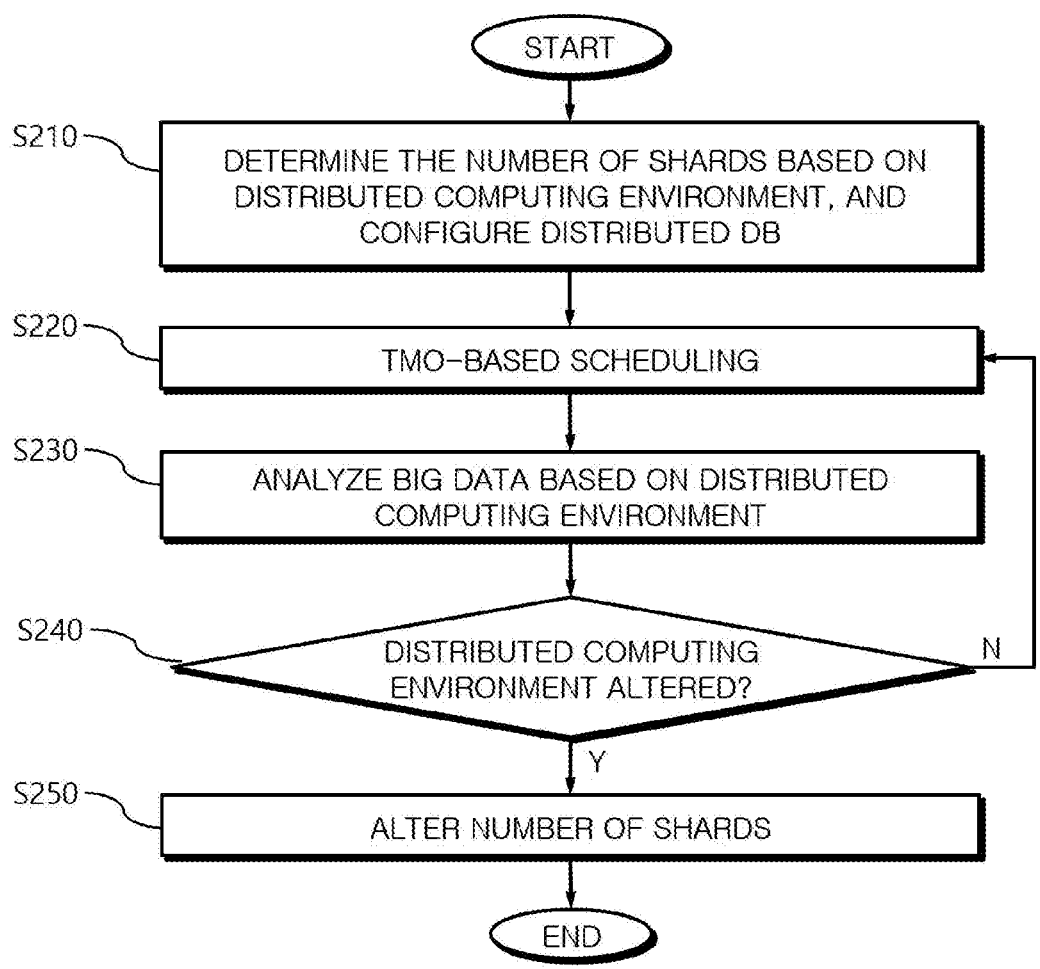
FIG. 3 is a view provided to explain a big data processing method according to yet another embodiment of the present disclosure.

The big data processing method by the DBMS illustrated in FIG. 2 is presented in FIG. 3. FIG. 3 is a view provided to explain big data processing method according to yet another embodiment of the present disclosure.

As illustrated in FIG. 3, the distributed server 130 determines the number of the shards based on the distributed computing environment, and configures the distributed DB (S210). Further, the distributed server 130 performs TMO-based scheduling (S220), and performs big data analysis based on the distributed computing environment (S230).

Thereafter, when an alteration occurs in the distributed computing environment (S240-Y), the distributed server 130 alters the number of the shards, so as to maintain concurrency of the big data analysis (S250).

5. Real-Time Stream Processing Apparatus

Figure 4:
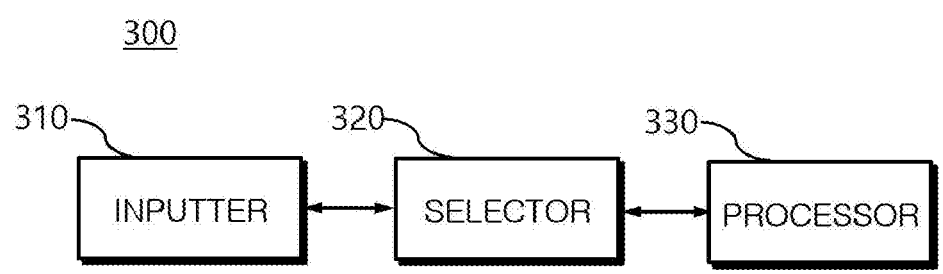
FIG. 4 is a view schematically illustrating a configuration of a real-time stream processing apparatus according to an embodiment of the present disclosure.

FIG. 4 is a view schematically illustrating a configuration of a real-time stream processing apparatus 300 according to an embodiment of the present disclosure.

As illustrated in FIG. 4, the real-time stream processing apparatus 300 includes an inputter 310, a selector 320 and a processor 330.

The inputter 310 receives input of stream data from a stream data source. The inputter 310 may receive input of various forms of stream data from various sources such as the Internet, SNS, database and the like.

Specifically, the stream data may include structured data, semi-structured data and unstructured data.

The structured data represents data stored in a fixed field of the type of a database. Examples of the structured data include relational database and spread sheet.

The semi-structured data represents data stored in a form that does not comply with the data model of a structured form connected with a relational database or another form of data table. The semi-structured data does not have a structured form, but includes a tag, schema or other markers, and may thus differentiate semantic elements and express records and field layers within data. Examples of the semi-structured data include extensible markup language (XML), JavaScript Object Notation (JSON) and Non-SQL database, etc.

The unstructured data refers to data that is not structured but has different forms and structures such as pictures, images and documents, unlike the data having a certain standard or form. Examples of the unstructured data include not only traditional data such as books, magazines, documental medical records, voice information and image information, but also data generated in mobile devices and online such as emails, twitters and blogs.

As such, the inputter 310 receives input of various kinds of stream data.

The selector 320 selects a real-time stream data processing method according to the type of the stream data.

Here, the selector 320 may even differentiate the type of the stream data using the data type information recorded in the input stream data. For example, pre-stored data type information includes information on what kind of data the structured data is (for example, tag information or ID information and the like representing the structured data), and information on what kind of data the semi-structured data is (for example, tag information or ID information and the like representing the semi-structured data). Then, the selector 320 determines whether the corresponding data is structured data or semi-structured data using the data type information of the input stream data, and if the corresponding data is neither structured data nor semi-structured data, the selector 320 may determine that the corresponding data is unstructured data. However, such a method of selecting the type of the stream data is merely an embodiment, and thus various methods for selecting the type of stream data may of course be applied to the selector 320 besides the aforementioned.

When the stream data is unstructured data or semi-structured data, the selector 320 selects the micro-batching method as the real-time stream data processing method. The micro-batching method refers to a stream data processing method that bundles up all the events that are introduced within a certain time interval using a buffer and processes it as one array unit.

Here, the micro-batching method uses a fixed size buffer. Detailed explanation on the fixed size buffer will be made hereinafter with reference to FIGS. 8 and 9.

If the stream data is structured data, the selector 320 selects the event stream processing method as the real-time stream data processing method. The event stream processing method refers to a stream data processing method that processes the stream data the instant that an event regarding the stream data is introduced.

Further, the real-time stream processing apparatus 300 may be set to an automatic mode or a manual mode. When set to the automatic mode, the selector 320 automatically determines the stream data processing method according to the type of the stream data as mentioned above. However, when set to the manual mode, the selector 320 selects the real-time stream data processing method set by the user.

The processor 330 processes the input stream data according to the selected real-time stream data processing method. In addition, the processor 330 performs subsequent procedures such as sending the processed stream data to a stream sink and the like.

The real-time stream processing apparatus 300 having such a configuration is capable of automatically selecting the real-time stream data processing method according to the type of the stream data and process the stream data accordingly, thereby increasing the processing rate of the real-time stream processing service.

The real-time stream processing apparatus 300 illustrated in FIG. 4 may be realized not only as an apparatus that is physically independent in itself, but also in a form that is included as part of a certain apparatus or system, or in a software form such as a program, framework or application and the like installed in a computer or server and the like. Further, each element of the real-time stream processing apparatus 300 may be realized as a physical element, or as an element in the functional form of software.

6. Real-Time Stream Processing Method

Figure 5:
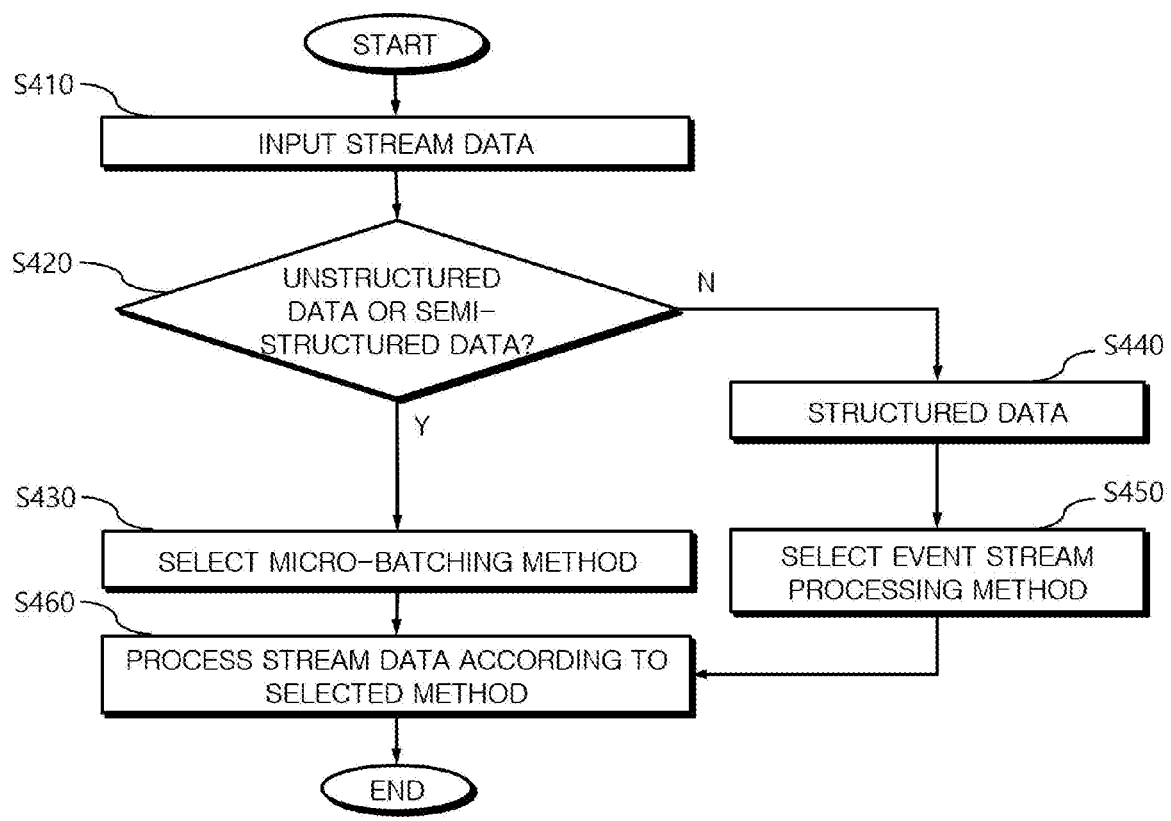
FIG. 5 is a view provided to explain a real-time stream processing method according to another embodiment of the present disclosure.

FIG. 5 is a view provided to explain a real-time stream processing method according to another embodiment of the present disclosure.

First of all, the real-time stream processing apparatus 300 receives input of stream data from a stream data source (S410). The real-time stream processing apparatus 300 may receive input of various forms of stream data from various sources such as the Internet, SNS, database and the like.

In addition, the real-time stream processing apparatus 300 selects a real-time stream data processing method according to the type of the input stream data.

Specifically, in the case where the stream data is unstructured data or semi-structured data (S420-Y), the real-time stream processing apparatus 300 selects the micro-batching method as the real-time stream data processing method (S430). Here, the micro-batching method uses a fixed size buffer. Detailed explanation on the fixed size buffer will be made hereinafter with reference to FIGS. 8 and 9.

On the other hand, in the case where the stream data is structured data (S420-N, S440), the real-time stream processing apparatus 300 selects the event stream processing method as the real-time stream data processing method (S450).

Thereafter, the real-time stream processing apparatus 300 processes the input stream data according to the selected real-time stream data processing method (S460). Further, the real-time stream processing apparatus 300 performs subsequent procedures such as sending the processed stream data to the stream sink.

Figure 6:
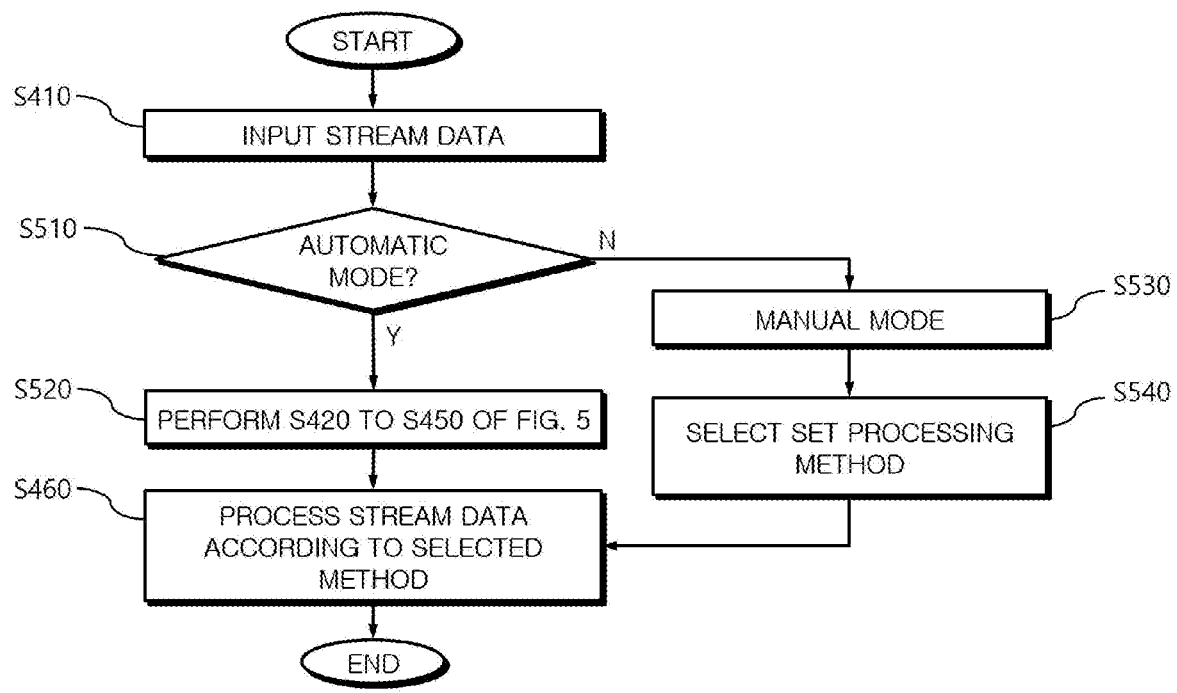
FIG. 6 is a view provided to explain a real-time stream processing method according to yet another embodiment of the present disclosure.

Meanwhile, the real-time stream processing apparatus 300 may be set to an automatic mode or a manual mode. This will be explained based on FIG. 6. FIG. 6 is a view provided to explain a real-time stream processing method according to yet another embodiment of the present disclosure.

First of all, the real-time stream processing apparatus 300 receives input of stream data from a stream data source (S410).

Then, the real-time stream processing apparatus 300 confirms whether the current set mode is an automatic mode or a manual mode. In the case where the current mode is an automatic mode (S510-Y), the real-time stream processing apparatus 300 automatically determines the stream data processing method based on the type of the stream data according to steps S420 to S450 of FIG. 5 mentioned above (S520). However, in the case the current mode is a manual mode (S510-N, S530), the real-time stream processing apparatus 300 selects the real-time stream data processing method set by the user (S540). Thereafter, the real-time stream processing apparatus 300 processes the input stream data according to the selected real-time stream data processing method (S460).

Through such a process, the real-time stream processing apparatus 300 becomes capable of automatically selecting the real-time stream data processing method according to the type of the stream data and processing the stream data accordingly, thereby increasing the processing rate of the real-time stream processing service.

Figure 7:
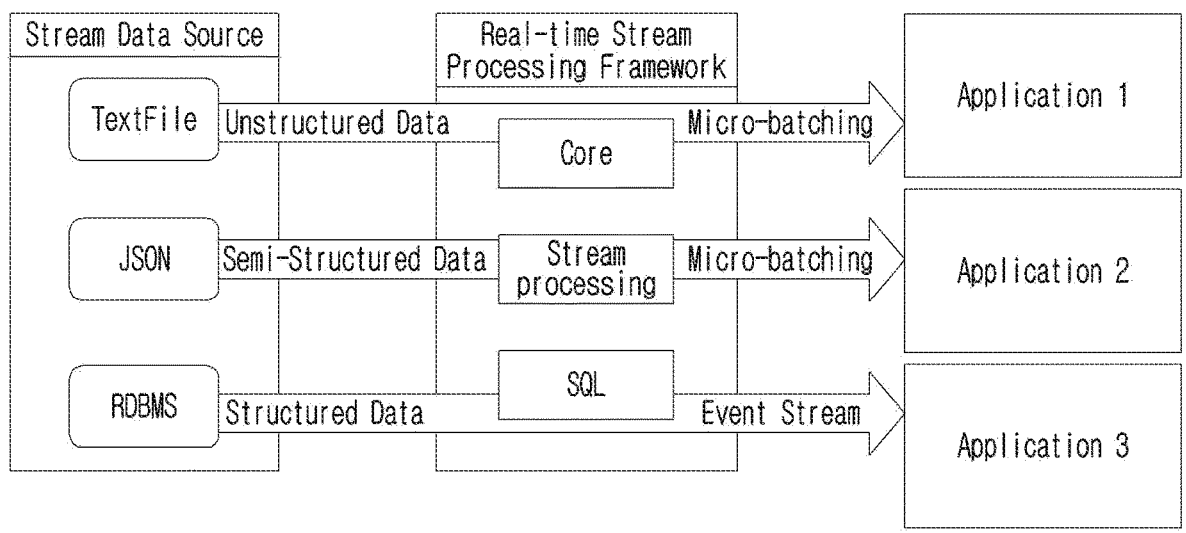
FIG. 7 is a view schematically illustrating a real-time stream processing method according to yet another embodiment of the present disclosure.

7. Concurrent Support of Streaming Model and Automatic Selection of Streaming Model FIG. 7 is a view schematically illustrating a real-time stream processing method according to yet another embodiment of the present disclosure. As illustrated in FIG. 7, according to the present embodiment of the present disclosure, one can see that the streaming model is supported in the micro-batching method and in the event stream processing method at the same time, and automatically selected.

According to FIG. 7, in the case where the stream data source is a text file, thus the stream data being unstructured data, one can see that the stream data is processed in the micro-batching method in Application 1.

Further, according to FIG. 7, in the case where the stream data source is a JSON, thus the stream data being semi-structured data, one can see that the stream data is processed in the micro-batching method in Application 2.

Further, according to FIG. 7, in the case where the stream data source is an RDBMS, thus the stream data being structured data, one can see that the stream data is processed in the event stream processing method in Application 3.

As such, one can see that, in the real-time stream processing apparatus 300, the streaming model is supported in the micro-batching method and the event stream processing method at the same time, and automatically selected according to the type of the stream data.

8. New Micro-Batching Method

Figure 8:
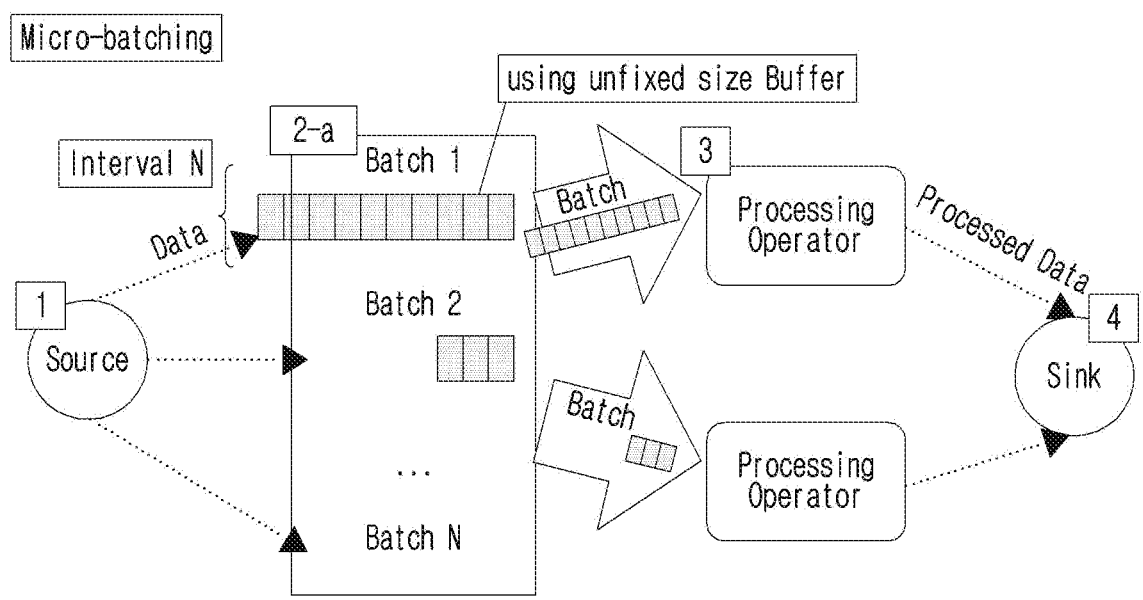
FIG. 8 is a view schematically illustrating a conventional micro-batching method.

FIG. 8 is a view schematically illustrating the micro-batching method.

As illustrated in FIG. 8, one can see that the micro-batching method bundles up all the stream data being input during Interval N in one array unit, and transmits and processes the same. However, since all the data being input during Interval N is processed in one array unit, there occurs a problem where the delay time significantly increases due to the stream data being concentrated on a certain time.

Figure 9:
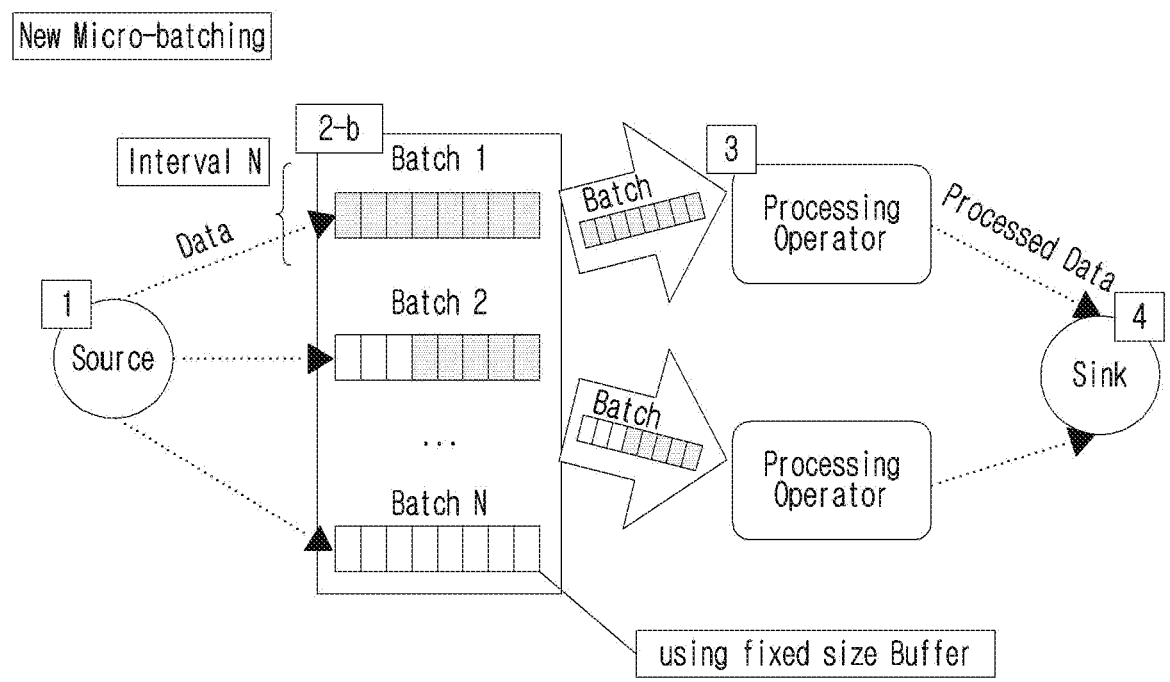
FIG. 9 is a view schematically illustrating a micro-batching method according to yet another embodiment of the present disclosure.

A measure to solve this problem is a new micro-batching method illustrated in FIG. 9. FIG. 9 is a view schematically illustrating a micro-batching method according to yet another embodiment of the present disclosure.

As illustrated in FIG. 9, one can see that the micro-batching method according to the present embodiment of the present disclosure uses a fixed size buffer. That is, when processing the stream data in the micro-batching method, the real-time stream processing apparatus 300 divides the stream data being input during Interval N into fixed size buffer units, and generates array units accordingly.

Specifically, in the case where the stream data being input during Interval N is greater than the buffer unit, the real-time stream processing apparatus 300 divides the input stream data into two or more array units and processes the same accordingly. Further, in the case where the stream data being input during Interval N is identical to the size of the buffer unit, the real-time stream processing apparatus 300 processes the input stream data in one array unit. Further, in the case where the stream data being input during Interval N is smaller than the size of the buffer unit, the real-time stream processing apparatus 300 processes the input stream data in one array unit that includes empty space.

As such, in the real-time stream processing apparatus 300, a micro-batching method using a fixed size buffer unit is applied, and therefore, it is possible to improve the problem of load balancing performance compared to conventional methods, and to guarantee short delay time.

Meanwhile, the technical concept of the present disclosure may of course be applied to a computer readable record medium having a computer program that enables the functions of the apparatus and method according to the present embodiment as well. Further, the technical concept according to the various embodiments of the present disclosure may be realized in the form of a computer readable code recorded in a computer readable record medium. The computer readable record medium may be any type of data storage device that may be read by a computer and that may store data. For example, the computer readable record medium may of course be ROM, RAM, CD-ROM, magnetic type, floppy disk, optical disk, or hard disk drive and the like. Further, a computer readable code or program stored in the computer readable record medium may be transmitted via a network connecting computers.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

What is claimed is:

1. A real-time stream processing method comprising:
   receiving input of stream data;
   selecting a real-time stream data processing method according to a type of the stream data; and
   processing the input stream data according to the selected real-time stream data processing method,
   wherein the selecting selects one of a first real-time stream data processing method and a second real-time stream data processing method according to the type of the stream data,
   wherein the type of the stream data comprises structured data, semi-structured data and unstructured data,
   wherein
      the selecting selects the first real-time stream data processing method as the real-time stream data processing method when the stream data is the unstructured data or the semi-structured data,
      the first real-time stream data processing method is a micro-batching method, and
      the micro-batching method uses a fixed size buffer, and
   wherein
      the selecting selects the second real-time stream data processing method as the real-time stream data processing method when the stream data is the structured data, and
      the second real-time stream data processing method is an event stream processing method.

2. The real-time stream processing method of claim 1, further comprising
   setting an automatic mode or a manual mode, wherein the selecting selects the real-time stream data processing method set by a user.

* * * * *